United States Patent [19]

Davison

[11] Patent Number: 4,578,430

[45] Date of Patent: Mar. 25, 1986

[54] CONTROLLED DEGRADATION OR CRACKING OF ALPHA-OLEFIN POLYMERS

[75] Inventor: Sol Davison, Houston, Tex.

[73] Assignee: Shell Oil Company, Houston, Tex.

[21] Appl. No.: 683,748

[22] Filed: Dec. 19, 1984

[51] Int. Cl.$^4$ ............................................... C08J 7/12
[52] U.S. Cl. .................................... 525/387; 525/333.8
[58] Field of Search .............................. 525/387, 333.8

[56] References Cited

U.S. PATENT DOCUMENTS

| | | | |
|---|---|---|---|
| 3,144,436 | 8/1964 | Greene et al. | 525/333.8 |
| 3,862,265 | 1/1975 | Steinkamp et al. | 260/878 A |
| 3,887,534 | 6/1975 | Baba et al. | 260/93.7 |
| 3,898,209 | 8/1975 | Watson et al. | 260/93.7 |
| 3,940,379 | 2/1976 | Castagna et al. | 260/88.2 S |
| 4,001,172 | 1/1977 | Steinkamp et al. | 260/42.18 |
| 4,060,569 | 11/1977 | Woods et al. | 526/352.2 |
| 4,061,694 | 12/1977 | Castagna | 260/878 B |
| 4,087,486 | 5/1978 | Fielding et al. | 260/897 A |
| 4,224,204 | 9/1980 | Nichols et al. | 524/313 |
| 4,239,546 | 12/1980 | Russell et al. | 524/277 |
| 4,359,495 | 11/1982 | Schroeder et al. | 428/35 |
| 4,375,531 | 3/1983 | Ross | 525/93 |
| 4,387,185 | 6/1983 | Schroeder et al. | 525/222 |
| 4,387,451 | 6/1983 | Wilcox | 367/142 |

*Primary Examiner*—Joseph L. Schofer
*Assistant Examiner*—Bernard Lipman
*Attorney, Agent, or Firm*—Dean F. Vance

[57] ABSTRACT

An improved process for the controlled reduction of average molecular weight and alteration of molecular weight distribution of $C_3$–$C_8$ alpha-monoolefin homopolymers or copolymers comprises adding a peroxide continuously at a programmed cyclic rate to the polymer or copolymer and heating the mixture in a melt extruder. The rate of peroxide addition is varied at a frequency with a period longer than the decomposition time of the peroxide but shorter than the passage time of the mixture through the extruder, so as to achieve combinations of melt flow and molecular weight distribution for the polymer not possible with prior art steady rates of addition.

7 Claims, 7 Drawing Figures

FIG.1 CONCEPTUAL BALANCE OF MELT/BULK PROPERTIES BY ADJUSTMENT OF MOLECULAR WEIGHT DISTRIBUTION (MWD)

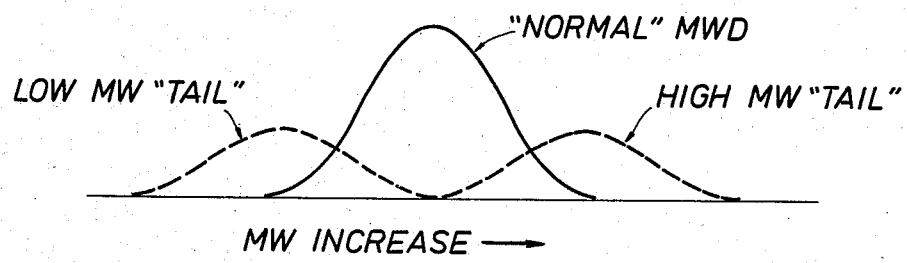

FIG.2 ALTERATION OF MWD BY CYCLIC VARIATIONS OF PEROXIDE INJECTION RATE
(USE: MIXING TIME > CYCLE PERIOD > CRACKING TIME)
(KEEP OVERALL PRODUCT MF CONSTANT - SYMBOLIZED BY DASHED LINES)

FIG.2A STANDARD-CONSTANT: NARROW MWD

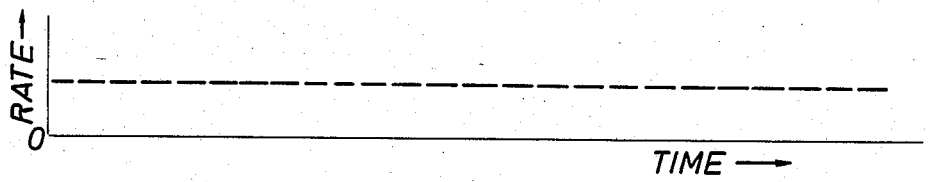

FIG.2B SINUSOIDAL: BROADEN MWD

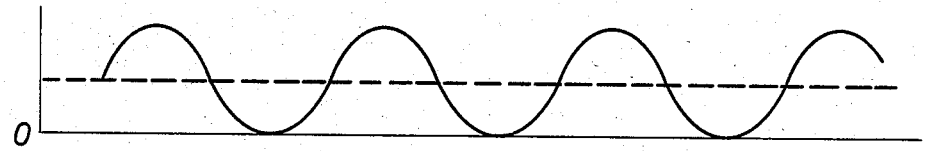

FIG.2C PULSED SQUARE: LOW MW TAIL

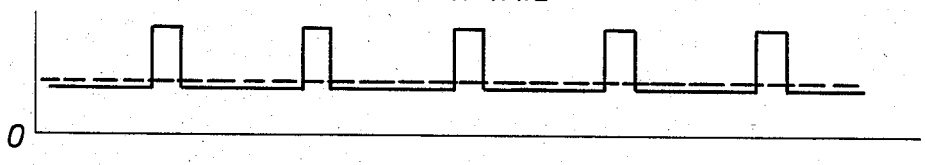

FIG.2D PULSED SQUARE: HIGH MW TAIL

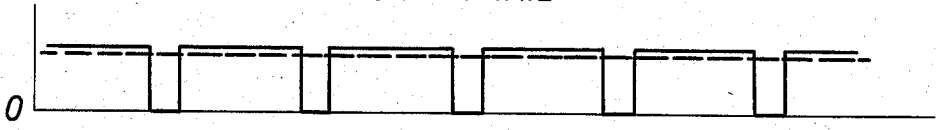

FIG.2E PULSED SQUARE: MINOR AMOUNT OF OVERCRACKED COMPONENT

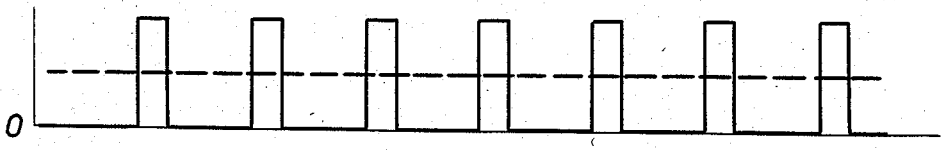

CONTROLLED DEGRADATION OR CRACKING OF ALPHA-OLEFIN POLYMERS

FIELD OF THE INVENTION

This invention relates to an improved process for the production of alphaolefin polymers. More particularly, this invention relates to an improved process for the controlled degradation or "cracking" of $C_3$-$C_8$ alpha-monoolefin polymers or copolymers.

BACKGROUND OF THE INVENTION

For many commercial end-uses, the melt-flow characteristics of $C_3+$ polyolefins, especially polypropylene, are not suitable because of the relatively high molecular weight (MW) of such polymer as it is originally produced in the synthesis process. Important end-uses where it has become well accepted that the melt flow characteristics of such polymers must be substantially improved are in fibers and/or films as well as in various extruded and injection- and blow-molded product grades.

In view of this need, it has been shown in the past that higher melt-flow characteristics can be achieved by controlled chain scission, which in effect reduces the molecular weight of the longer and thus high molecular weight chains. The average MW is reduced lowering the melt viscosity. Furthermore, the molecular weight distribution (MWD) is significantly altered, primarily because of the reduction of the high MW fraction. Improvement of melt properties associated with reduction of melt elasticity results in reduced die swell in extrusion and reduced spin resonance in fiber spinning. This chain cleavage is normally accomplished by oxygen and/or free radical sources such as peroxides.

The basic concept of accomplishing such degradation by utilizing peroxides is claimed in U.S. Pat. No. 3,144,436, where a free radical initiator is introduced into a polymer melt in the absence of oxygen in a screw extruder. U.S. Pat. No. 3,940,379 discloses a method for the degradation of propylene polymers to increase their melt flow rate which comprises contacting a propylene polymer with oxygen and an organic or inorganic peroxide, melting and working the resulting mixture in a high shear zone, and recovering an essentially odor-free propylene polymer. U.S. Pat. No. 4,061,694 discloses the manufacture of propylene molding compositions of improved impact strength by subjecting block copolymers of ethylene and propylene to controlled oxidative degradation under conditions essentially similar to those of the preceding patent. Other patents dealing with degradation of polypropylene include U.S. Pat. Nos. 4,375,531; 3,862,265; 3,887,534; 3,898,209; 4,001,172; 4,087,486; 4,359,495; 4,378,451 and 4,387,185.

A new term has been coined for such degraded or cracked polypropylene, that term being "controlled rheology" (CR) polypropylene. Although controlled rheology polypropylene has been commercially available for several years, its similarities and differences from "normal" or reactor polypropylene are just starting to be understood. CR polymers have a variety of advantages and disadvantages. The growing diversity of the polyolefin market is putting an increasing demand on polyolefin manufacturers for product grades to fit a large variety of processing behaviors as well as bulk mechanical properties. Increased control over MW and MWD in the manufacturing process is a powerful step in this direction.

Typically, the polypropylene producers have focused on the single property, "melt flow", when manufacturing CR polypropylene for specific products. However, another property molecular weight distribution (MWD) is also critically important. As discussed by Brown et al in "Molecular Weight Distribution and its Effect on Fiber Spinning", Fiber World, Vol. 1, No. 2, pages 32-43 (March 1984), the three commonly used molecular weight averages are $M_n$, $M_w$, and $M_z$. These are obtained by three different averaging methods, referred to as "number", "weight", and "z" and are based on ratios of successively higher moments of the MWD. The MWD itself can be defined by various ratios of these averages, as follows:

$Q = M_w/M_n$
$R = M_z/M_w$
$S = M_z/M_n$

In some cases, these are inadequate to express a detailed description of the MWD as they are based on averaging processes. In this case a detailed "spectral analysis" of the MWD is preferable, where separate segments of the MWD are specifically examined.

Polypropylene homopolymers of different MF have roughly the same shape of MWD when prepared by the same reactor process. With a CR resin, this MWD changes. The three molecular weight averages are all reduced in the CR process. The fastest changing average is $M_z$, while the slowest is $M_n$. This is not surprising since the high molecular weight end of the MWD is the most changed by the CR process. Also not surprising is that S decreases faster than Q, which decreases faster than R. After the CR process takes place, a MWD becomes skewed due to the preferential loss of the high molecular weight components. For a completely random scission process, Q approaches a limiting value of 2.0, while R approaches 1.5.

Rheological (melt flow) behavior is very sensitive to the MWD, particularly to the high molecular weight portion of the MWD. Reduction of the high molecular weight portion of the MWD with corresponding increase of the medium or low molecular weight portions of the MWD is referred to as "narrowing" of the MWD. The difference between "narrow" and "broad" MWD can have profound effects on melt processibility. For example, for two polypropylenes with the same melt flow index, but having different breadth of MWD, the polypropylene with the narrow MWD will generally show a reduced shear sensitivity over a wider shear range than that with the broad MWD. In the past it has not been possible to achieve independent variability of melt flow and molecular weight distribution without blending together various CR polymers or using different polymers from different polymerization conditions. I have discovered a new method that permits the preparation of increased melt flow products along with control over the desired molecular weight distribution, without blending, using a single degradation or cracking process.

SUMMARY OF THE INVENTION

The present invention is directed to an improved process for making alpha-olefin polymers and copolymers of controlled melt flow and molecular weight distribution. In particular, the present invention is directed to an improvement in the process for the degradation or cracking modification of a $C_3$–$C_8$ alpha-monoolefin homopolymer or copolymer, which process comprises adding about 0.001 to about 1.0 parts by weight of a peroxide to 100 parts by weight of said homopolymer or copolymer and heating the resulting mixture in a melt extruder at a temperature of from about 150° C. to about 300° C., more usually at a temperature of from about 190° C. to about 260° C. Prior art methods of preparing CR polyolefins involve either (1) prior mixing of a fixed amount of peroxide with polyolefin in a batch process or (2) a constant rate of addition of the peroxide to the polyolefin in a continuous process. The improvement claimed herein is concerned with a continuous process wherein the rate of addition is varied in a cyclic pattern during the process. An essential feature of this cyclic variation is that the rate of addition of said peroxide is varied at a frequency with a period longer than the decomposition time of said peroxide, but shorter than the passage time of said mixture through said extruder, so as to achieve the desired melt flow and molecular weight distribution for said homopolymer or copolymer.

A highly cracked polypropylene (PP) can be blended in minor proportion with an uncracked PP to increase melt flow above that of the uncracked PP. This blend may have melt flow of a non-blended PP directly cracked by the currently employed peroxide cracking technology. However, although the blend and directly-cracked material have equal melt flows, they may have distinctly different MWD's. This may be understood by considering what cracking does to the MWD. Cracking reduces the very high MW fraction and, at the same time, increases the mid-MW fraction and shifts the peak of the MWD to lower MW. The very low MW fraction remains virtually unchanged. In a blend containing a major amount of uncracked material, the high MW fraction is, therefore, mostly retained. The minor amount of cracked material supplies more mid-MW fraction shifted to lower values. The net result is that the blend can be designed to have a broad MWD, approaching that of the uncracked material. The cracked component in the blend then serves more as a powerful flow promoter to achieve the desired blend MF, whereas the uncracked portion of the blend supplies the high molecular weight to modify melt processing as well as bulk properties of the product.

I have shown that in-situ production of a desired proportion of cracked and uncracked PP and subsequent blending of these can be done in the extruder where cracking takes place. Briefly, the method is conceptualized as follows: The rate of peroxide injection into the powder basestock is strategically programmed so that portions of the PP will be left uncracked, whereas other portions are "overcracked" relative to usual level of cracking. The rate of injection may be varied or "cycled" at a frequency with a period longer than reaction time, but shorter than passage time through the extruder. This is possible because the time required for cracking is much shorter than extruder passage time. Thus, cracking may be confined to the first (upstream) half of the extruder, where mixing is relatively poor, whereas mixing or blending of the cracked and uncracked materials can occur in the second half of the extruder where mixing is more efficient.

General considerations relating to adjustment of MWD and its effect on melt and bulk properties are summarized in FIG. 1 as a simplified representation of "addition of a low or high MW tail". These "tails" are exaggerated in the figure for clarity.

FIG. 2 also shows a simplified representation, the achievement of "broad" MWD by four different cycling programs. Here again, it is evident that pulsing of the peroxide injection rate to achieve "over-cracking," "under-cracking" or "no-cracking" during the cycle can only be possible because the pulse period is selected between the relatively rapid time of peroxide decomposition and the relatively slow extruder passage time.

FIG. 2a shows the prior art method of constant addition of peroxide to attain desired melt flow. FIG. 2b shows the addition of peroxide according to a sinusoidal wave pattern. FIG. 2c shows the addition of peroxide by a pulsed square addition method to obtain a low MW tail, while FIG. 2d shows a pulsed square addition method to obtain a high MW tail. Another variation is shown in FIG. 2e, which is a pulsed square wave having a relatively short high pulse alternating with a relatively long pulse of zero amplitude. This would produce a blend having a minor amount of "over-cracked" component and a major uncracked component. This is the method actually used in the illustrative example.

The dotted line in FIGS. 2b, c, d and e is a symbolic representation of the average melt flow of the product held constant corresponding to the dotted line in FIG. 2a for the prior art method of peroxide addition.

The present invention has particular application for propylene polymers useful in fiber applications. Both melt flow (MF) and MWD of the polypropylene affect fiber properties. The effects of MF and MWD can be broadly related to processibility. In general, strength will decrease, and the draw ratio and processibility rate will increase as the MF increases. The effects of MWD on processibility are profound but are more difficult to define. Table 1 shows some general trends of properties as they relate to MF and MWD. These are generalizations, which may not always hold true for different processing conditions. Nevertheless, the table does provide some guidance for appropriate adjustment of MF and MWD:

TABLE 1

TRENDS FOR POLYPROPYLENE RESINS PROCESSED UNDER IDENTICAL CONDITIONS

| Property | Resins with same shape MWD. Trend as MF increases. | Resins with same MF. Trend as MWD narrows. |
|---|---|---|
| Maximum obtainable draw ratio | Increases | Decreases |
| Maximum obtainable melt drawdown | | Increases |
| Draw resonance | | Decreases |
| Ease of orientation | Decreases | |
| Extrudability at die | Increases | |
| Fiber strength | Decreases | |
| Elongation at a given draw ratio | Increases | Decreases |
| Tenacity at a given draw ratio | Decreases | Increases |
| Modulus at a given draw ratio | Decreases | |
| Orientation at a given draw ratio | Decreases | |
| Birefiringence at a given draw ratio | Decreases | Increases |
| Processing speed | Increases | Increases |

In cracking a given polyolefin according to the prior art, a single steady rate of addition of peroxide in the continuous process results in a raising of the MF and narrowing of the MWD. With the exception of a general raising of processing speed, Table 1 shows that these changes in MF and MWD will produce opposite directions of changes, respectively, in other processing properties. Because of this, the advantage of cracking may therefore be reduced or even become a disadvantage for some aspects of processing. The MF and MWD cannot be independently controlled in the prior art, since for a given starting material, the final MWD is determined by the extent of cracking or by the final MF. The manufacturer is effectively "locked-in" to accepting a given set of processing properties dependent on his selection of desired MF. The primary advantage of the invention in this context is the capability of independent control of MWD for a given MF by use of an added degree of Freedom, namely the cycling mode and/or frequency used in the peroxide addition.

DETAILED DESCRIPTION OF THE INVENTION

The polymers that are modified or degraded according to the present invention are homopolymers and copolymers of $C_3$ to $C_8$ alpha-monoolefins. Polypropylene is preferred. However, other polyolefins which can be processed according to the technique of this invention include propylene/ethylene impact copolymers, polybutene-1, poly-3-methylbutene-1, poly-4-methylpentene-1, propylene/4-methylpentene-1 copolymers, polyallomers and the like. With regard to the propylene polymer, starting melt flows are about 0.2 to about 20, preferably about 0.5 to about 3.0.

A key aspect of the present invention is that the peroxide employed for cracking must have a decomposition time which is shorter than the passage time of the polymer/peroxide mixture through the melt extruder. For example, the passage time of a polymer through a 32'×1' Egan face-cutting extruder is about two minutes. Therefore, the peroxide employed with such a machine must have a decomposition time shorter than two minutes. Further, the rate of peroxide addition is varied at a frequency with a period longer than the decomposition time of the peroxide. Accordingly, it is generally preferred that the peroxide have a decomposition time (defined as the half-life at the extrusion temperature) of about 1 to about 30 seconds. If the peroxide has a half-life of less than one second, the peroxide is too unstable and can be decomposed before reacting with the polymer to the desired extent. If the half-life is more than about 30 seconds, then reaction may be incomplete and/or selection of the frequency of addition may be too constrained to achieve the desired results. Preferred peroxides are those which have relatively high decomposition temperatures and produce volatile decomposition products, the latter being relatively non-toxic and with minimal residual odor. The peroxide of choice is 2,5-dimethyl-2,5-di(t-butylperoxy)hexane (Lupersol 101, manufactured by Lucidol, a division of the Pennwalt Co.). Many peroxides fit this category and choice is determined by economic considerations and physical form of the peroxide relative to efficiency of utilization. Many of the peroxides that are compatible with this invention are dialkyl peroxides but are not limited to this class. Specific examples manufactured by the Lucidol Company are dicumyl peroxide (Luperox 500), di-t-butyl peroxide, t-butyl cumyl peroxide (Lupersol 801) and 2,5,dimethyl-3,5-bis(t-butylperoxy)hexene-3 (Lupersol 130). The amount of peroxide and the cracking temperature depend upon the melt flows of the starting polymers and the desired melt flow of the final composition. Typical amounts of peroxide are between about 100 parts by weight per million parts by weight total polymer (ppmw) and about 10,000 ppmw, preferably between about 200 ppmw and about 1,000 ppmw. Typical cracking temperatures are between about 150° C. and about 300° C., preferably between about 190° C. and about 260° C.

Preferably the peroxide is added to the polymer powder prior to injection into the extruder. However, it is also possible to add the peroxide directly into the polymer melt in the extruder. If it is added in this fashion, the point of injection should be downstream at a portion of the extruder where complete melting of the extrudate is first achieved. Advantage of direct addition of the peroxide to the melt is that reaction is not delayed by the time required to achieve the melt temperature from the powder entry temperature. The result is a shorter reaction time increasing the range available for frequency alteration.

Additional components may be added to the above compositions as long as the amount of peroxide and poly(alpha-monoolefin) are within the ranges specified above. These compositions may be compounded further with other polymers, oils, fillers, blowing agents, reinforcements or impact modifiers such as rubbers and rubber/thermoplastic blends, antioxidants, stabilizers, fire retardants, antiblocking agents and other rubber and plastic compounding ingredients without departing from the scope of this invention.

One possible arrangement for the injection pulsing involves the use of a 3-way valve. The 3-way valve is periodically actuated by a timed solenoid to provide the pulse of peroxide solution injection. Peroxide may be returned to the storage tank on the "off" period. An effective means for pulsing might also be provided by simply rotating the valve at constant speed. In this case, pulses would be sinusoidally shaped rather than rectangular. A constant pressure device would be necessary in any case for normal or direct injection. To avoid excessive repeated pumping of a given portion of peroxide solution (which causes degradation) an excess of peroxide solution should be in the reservoir tank. Ideally, the volume of solution should be at least N times that actually used, where N is the ratio of off/on times. This would allow an average of one pumping cycle for each portion of peroxide.

As used in the examples, melt flow is the amount (in grams per 10 minutes) of polymer which flows through a capillary with relatively small L/D ratio under ASTM D1238 Condition L at 230° C. This measurement is done under constant stress. Neglecting end effects, the shear rate experienced by a polymer in a melt indexer with capillary of radius R is given by:

$$\dot{\gamma} = \frac{4Q}{\pi R^3}$$

where Q is the volumetric flow rate and R is 0.1045 cm. Thus polypropylene with a density of 0.7386 at 230° C. and a melt flow value of 'X' will experience a shear rate of about:

$$\dot{\gamma} = 2.5(\times)\text{sec}^{-1}$$

in the melt indexer. For most commercial polypropylenes (MF in the range of 1–20) the melt indexer relates to behavior at moderately low shear rate (2.5–50 sec$^{-1}$). This is important to remember, since the area of real interest might be the shear flow behavior at the spinnerette. This will generally be on the order of 10 to 1,000 times the shear rate experienced in the melt indexer, for typical fiber spinning applications. Even at the lower shear processes encountered in extrusion or injection molding, shear rates may be many times that experienced in the melt indexer. Since polymers are highly non-Newtonian (viscosity is dependent on shear rate), melt flow index may be misleading in ranking processibility speeds of different product grades.

To illustrate the invention, the following illustrative embodiment is given. It is to be understood, however, that the embodiment is given for illustration only and the invention is not to be regarded as limited to any of the specific materials or conditions used in the specific embodiment.

ILLUSTRATIVE EXAMPLE

This illustrative example describes a test of the peroxide cycled addition conducted at a plant scale level. The extruder used had twelve-inch diameter and produced 10,000 lbs of pelletized polypropylene per hour. Starting material was polypropylene with a melt flow of 1.5 and cracking was conducted to obtain a melt flow of 4.5±0.2. At this level of cracking, destruction of the higher MW fraction of the MWD is significant but not extensive. The increased MF was necessary to achieve the desired processing speed, yet the small changes in MWD resulted in some undesirable changes in processing behavior (fiber-spinning application) when the conventional (non-pulsed) cracking technique was used. The use of the pulsed method succeeded in altering the MWD in the desired direction. Table 2 shows the MWD spectral analyses of the pulsed and non-pulsed cracked products obtained by high temperature gel permeation chromatography (GPC). The more detailed spectral analysis was required to detect MWD differences, since the Q, R and S values tended to obscure the subtle changes in the MWD caused by the pulsing technique.

The pulsing technique used is the one described by FIG. 2e. Table 2 shows the spectral analyses for the two pulsing variations (pulsed-into-powder and pulsed-into-melt) and the conventional steady variation. Also given in the table are the melt flows as well as the values for Mn, Mw, Mz, Q, R and S for the three variations. The following conditions were used for delivery of a 50% mineral oil solution of peroxide (2,5-dimethyl-2,5-di(t-butylperoxy)hexane to achieve the desired melt flow.

STEADY INTO POWDER (Conventional): 22 cc/min.

PULSED INTO POWDER: peroxide injected into the powder crammer feed to the extruder, 1.4 seconds "on"; 23 seconds "off" at 55 cc/min.

PULSED INTO MELT: peroxide injected into the extruder melt, 1.5 seconds "on"; 12.5 seconds "off" at 100 cc/min.

Table 2 shows the spectral analyses to be clearly different for the three variations. Compared to the conventional "steady into powder", the "pulsed into powder" shows a definite shift to increased amount of higher molecular weights compensated by reduction in amount of lower molecular weights. A molecular weight shift is also apparent for the "pulsed into melt", but is more to an increase in the amount of the midrange molecular weight compensated by a reduction in the amount of lower molecular weights.

TABLE 2

POLYPROPYLENE CRACKING PROCESS: PULSED VS STEADY INJECTION OF PEROXIDE
Spectral Analysis of Molecular Weight Distribution in Half-Decade Segments

| Molecular Weight Range | Sample 421-2 (Steady Injection into Powder) Percent | Sample 421-1 (Pulsed Injection into Powder) Percent | Sample 421-3 (Pulsed Injection into Melt) Percent | Percent Difference (Pulsed Injection into Powder-Continuous Injection into Powder) | Percent Difference (Pulsed Injection into Melt-Continuous Injection into Powder) |
|---|---|---|---|---|---|
| $10^3$:1.00 to 3.16 | 1.8 | 1.5 | 1.4 | −0.3 | −0.4 |
| $10^3$:3.16 to 10.0 | 3.7 | 3.6 | 3.6 | −0.1 | −0.1 |
| $10^4$:1.00 to 3.16 | 10.9 | 10.5 | 11.0 | −0.4 | +0.1 |
| $10^4$:3.16 to 10.0 | 20.7 | 19.9 | 20.9 | −0.8 | +0.2 |
| $10^5$:1.00 to 3.16 | 33.6 | 33.6 | 34.1 | 0.0 | +0.5 |
| $10^5$:3.16 to 10.0 | 21.1 | 22.3 | 21.3 | +1.2 | +0.2 |
| $10^6$:1.00 to 3.16 | 7.0 | 7.4 | 6.7 | +0.4 | −0.3 |
| $>3.16 \times 10^6$ | 1.1 | 1.1 | 1.0 | 0.0 | −0.1 |
| TOTAL | 99.9 | 99.9 | 100.0 | 0.0 | +0.1 |
| $M_n \times 10^{-3}$ | 35.8 | 36.4 | 35.0 | | |
| $M_w \times 10^{-3}$ | 380 | 382 | 364 | | |
| $M_z \times 10^{-3}$ | 1,680 | 1,550 | 1,500 | | |
| Q | 10.6 | 10.5 | 10.4 | | |
| R | 4.4 | 4.1 | 4.1 | | |
| S | 46.9 | 36.4 | 42.9 | | |
| MF (dg/min) | 4.4 | 4.6 | 4.3 | | |

What is claimed is:

1. In the process for the degradation modification of a propylene homopolymer or copolymer having a melt flow of about 0.2 to about 20, which process comprises adding about 0.0001 to about 1.0 parts by weight of a peroxide to 100 parts by weight of said homopolymer or copolymer and heating the resulting mixture in a melt extruder at a temperature of from about 150° C. to about 300° C., the improvement wherein the rate of addition of said peroxide is cyclically varied at a frequency with a period longer than the decomposition time of said peroxide, but shorter than the passage time of said mixture through said extruder, so as to achieve the desired melt flow and molecular weight distribution for said homopolymer or copolymer, wherein (a) said peroxide decomposition time is the half-life of the peroxide at the temperature in said extruder;

(b) said peroxide has a half-life at about 1 second to about 30 seconds at the temperature in said extruder;
(c) said passage time in said extruder is between about 0.5 and about 5 minutes; and
(d) said peroxide is cyclically varied by a method selected from the group consisting of:
  (i) pulsed square addition having a relatively short period of high peroxide addition alternating with a relatively long period of no peroxide addition;
  (ii) pulsed square addition having a relatively long period of high peroxide addition alternating with a relatively short period of no peroxide addition;
  (iii) pulsed square addition having alternating periods of high addition of peroxide and low addition of peroxide; and
  (iv) continuously changing rate of addition of peroxide according to a sinusoidal wave pattern.

2. The process according to claim 1 wherein said propylene homopolymer has a melt flow of about 0.5 to about 3.0.

3. The process according to claim 1 wherein said peroxide is mixed with said homopolymer or copolymer prior to injection into said extruder.

4. The process according to claim 1 wherein said peroxide is added into said extruder separately from the injection of said homopolymer or copolymer.

5. The process according to claim 1 wherein said peroxide is a dialkyl peroxide.

6. The process according to claim 1 wherein said peroxide in 2,2-dimethyl-2,5-di(t-butylperoxy)hexane.

7. The process according to claim 6 wherein the polymer employed is a propylene homopolymer having a starting melt flow of about 0.5 to about 3.0, said peroxide is mixed with said homopolymer prior to injection into said extruder, and the method of adding said peroxide is a pulsed square addition method having a relatively short period of high peroxide addition alternating with a relatively long period of no peroxide addition, resulting in a controlled rhelogy polymer having a higher melt flow and a changed molecular weight distribution.

* * * * *